(12) United States Patent
Knobloch et al.

(10) Patent No.: US 9,658,993 B2
(45) Date of Patent: May 23, 2017

(54) CONCURRENT PREPARATION OF MULTIPLE VERSIONS OF A WEBSITE

(71) Applicant: Adobe Systems Incorporated, San Jose, CA (US)

(72) Inventors: Gilles Knobloch, Wahlbach (FR); Cédric Huesler, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 722 days.

(21) Appl. No.: 14/075,381

(22) Filed: Nov. 8, 2013

(65) Prior Publication Data
US 2015/0134629 A1 May 14, 2015

(51) Int. Cl.
*G06F 17/30* (2006.01)
*G06F 17/22* (2006.01)
*G06F 9/44* (2006.01)

(52) U.S. Cl.
CPC ........... *G06F 17/2288* (2013.01); *G06F 8/71* (2013.01); *G06F 17/3089* (2013.01)

(58) Field of Classification Search
CPC ................................ G06F 8/71; G06F 17/3089
See application file for complete search history.

(56) References Cited

U.S. PATENT DOCUMENTS 8,245,192 B1 * 8/2012 Chen .................... G06F 8/30
717/103
2003/0115220 A1 * 6/2003 Chan .................. G06F 17/3089

* cited by examiner

*Primary Examiner* — Kris Mackes
(74) *Attorney, Agent, or Firm* — Finch & Maloney PLLC

(57) ABSTRACT

Techniques are disclosed for concurrent preparation of multiple versions of a website. Web page content can be branched in response to a request from a first user to create a working copy of one or more production web pages source documents. Any edits applied to the production version of the documents may be automatically applied to the working copy. Further, the working copy can be edited independently of the production version. The working copy can be promoted to production by replacing the production version with the edited working copy. Any number of separate working copies can be created and edited concurrently with the production version.

20 Claims, 9 Drawing Sheets

CONCURRENT PREPARATION OF MULTIPLE VERSIONS OF A WEBSITE

FIELD OF THE DISCLOSURE

This disclosure relates to the field of data processing, and more particularly, to techniques for concurrently preparing multiple versions of one or more web pages.

BACKGROUND

Websites can be complex, comprehensive, and extensive in scope. For businesses, websites are an important component of the enterprise. As such, the quality, accuracy, completeness of the information, or content, presented on the website, as well as the functionality and navigability of the website, can have a significant effect on customer relations. A number of authors can collaborate to create and update the website. Moreover, the composition of the website can change from time to time. Some web pages may be frequently revised to present new content and remove outdated content as needed, for example, to incorporate new product releases, new support issues, new pricing structures, and so forth. As a result, the content presented on a website may be in a constant state of flux, with numerous revisions being prepared at any given time by multiple individuals.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Figure 1:
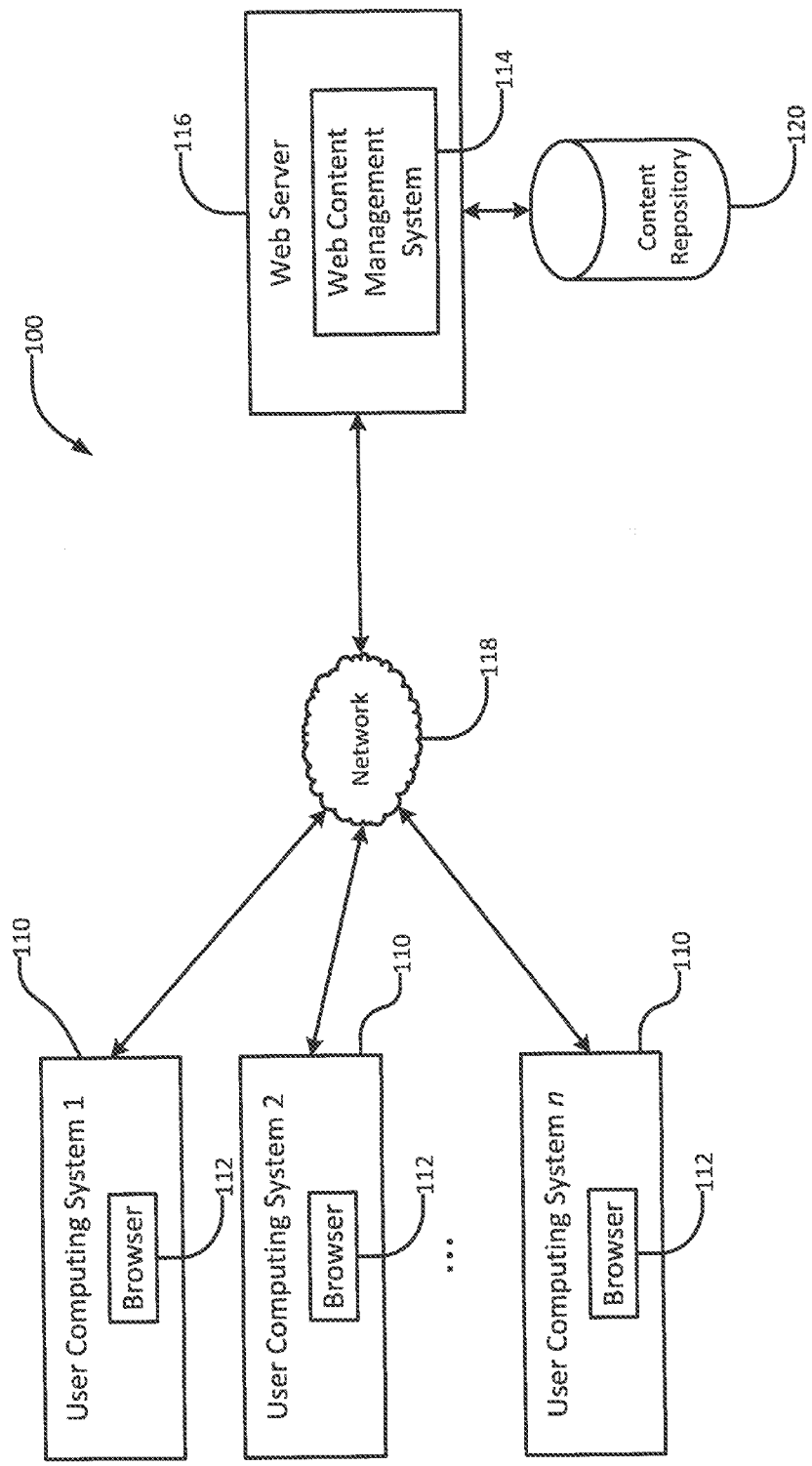
FIG. 1 illustrates an example client-server computing system configured in accordance with an embodiment of the present invention.

As discussed above, the content of a website can change from time to time, and there may be numerous individuals involved with the preparation of those changes. To this end, and as will be apparent in light of this disclosure, it may be desirable to have several different versions of the website in development concurrently with the production version of the website, which may be the version accessible via the World Wide Web. Given the significant manpower resources that may be allocated to create and update the website, website management can be cumbersome and manually-intensive. Further, given the large number of individuals that may be involved with various aspects of creating or updating website content, it can be difficult to ensure that concurrent changes by different authors are accurate and up-to-date. Currently, there are some solutions to this problem, such as using a different server to host alternate versions of the website, or merging changes made to different versions of the website. However, these solutions involve keeping different versions of the content synchronized by manually merging differences among copies, which can be a haphazard, time-consuming and error-prone process.

As will be further appreciated in light of this disclosure, it is recognized that often the content of a website is changed iteratively, which means that the next version of the website may be largely based on the current (e.g., production) version. As an example, a company may be working on a version of next season's product catalog, based on this season's product catalog, which is currently visible on their website. In such an example scenario, the company might like to manage different versions of the website content (e.g., this season's catalog and next season's catalog) concurrently. For instance, it may be desirable to incorporate any changes made to the current version into the next version while the next version is in development. In one such example case, while preparing marketing launches of new products, it may be necessary to change the content of the entire website or at least parts of it. However, at the same time it may still be desirable to edit the current version in the event that some aspect needs to be changed and published without having to temporarily remove all revisions made to the next version, apply the desired changes and publish, and then re-apply the earlier revisions to continue development. Moreover, there are some instances in which it is desirable to automatically copy changes applied to the production version into the next version of the page. Finally, it may be desirable to work on several different future versions of the website concurrently. A media agency could, for instance, prepare different versions of its homepage for each day of the week without having to wait for one version to go live before starting to prepare the next one.

To that end, and in accordance with an embodiment of the present invention, techniques are provided for concurrent preparation of multiple versions of a website. Such concurrent preparation includes editing the current and/or next versions of the website without having to first roll any changes already applied to the next version back to the current version, which would further necessitate reapplying the changes to the next version after the current version has been modified. For example, the content of a production web page can be copied, or branched, to create one or more working copies of the production web page(s), which permits one or more users to work on the production and working copies concurrently, with the ability to quickly switch from one to the other. Any edits applied to the production version of the document can be automatically applied to the working copy. Further, the working copy can be edited independently of the production version. The working copy can be promoted to production by replacing the production version with the edited working copy. Any number of separate working copies can be created and edited concurrently with the production version. Numerous configurations and variations will be apparent in light of this disclosure.

In one specific embodiment, an example methodology is provided for concurrent preparation of multiple versions of a web page. Initially, a production web page source document can be copied, or branched, at any time for preparation as a future version of the web page. One or more users can then start to work on the branched working copies without modifying the production version. In the meantime, the production version can be edited if desired. Edits applied to the production version can be automatically applied to each working copy. Once changes to the working copy are complete, that particular working copy can be promoted, which causes the production version of the web page to be replaced by the working copy. Note that because the working copy was automatically updated to include any changes made to the production version after that working copy was created, this promotion is simplified to a replacement process rather than a merging process, which can be much more intensive and error-prone. If more than one working copy has been created for the same production web page, any changes made to one particular working copy can also be applied to the other working copies when that particular working copy is promoted to production.

Thus, the production version can be published to the website for access by the website users. At any point in time, another working copy can become the production version by promoting the respective working copy or all working copies, or otherwise selectively inherited by user-selected working copies. Likewise, any changes made to the production version by promoting the other working copy can be inherited automatically by the first working copy. Each working copy can continue to exist after it has been promoted and can be edited again. The techniques as variously described herein provide for switching between different versions of a web page while editing each web page independently of the other; adding, editing and deleting paragraphs; and creating and deleting web pages within each branched working copy of the production web page. Once a working copy has been promoted, the previously production web page can be archived so that it can be restored to the state it was in before the working copy was promoted.

As used herein, the term "production web page source document," in addition to its plain and ordinary meaning, includes any document or file, such as HTML or XML code, JavaScript, Cascade Style Sheet (CSS) instructions, and/or other resources such as data, text, images, and multimedia which, when parsed by a web browser, can be used to render a web page. For example, a production web page source document may be used to render a version of a web page that is published on a website. Specific examples of web browsers include Microsoft Internet Explorer®, Mozilla Firefox®, Safari®, Google Chrome®, and Opera®.

As used herein, the terms "working copy" and "working copy of a production web source document," in addition to their plain and ordinary meanings, are used interchangeably and include any document or file, such as HTML or XML code, JavaScript, CSS instructions, and/or other resources such as data, text, images, and multimedia, which, when parsed by a web browser, can be used to render a web page. For example, a working copy may be a version of the web page that is edited off-line by a user prior to publication on a website. The working copy can include at least a portion of a corresponding production web page source document; however, the working copy can, in some instances, be entirely different than the production web page source document.

As used herein, the term "create," in addition to its plain and ordinary meaning and any other meanings described in this disclosure, includes a process of making a new copy of one or more existing web pages (e.g., a production web source document). The copy can be edited independently of the original web page(s); that is, changes made to the copy do not modify the original web page(s). For example, a working copy of a web page can be created as a document that is separate from the original web page.

As used herein, the term "restore," in addition to its plain and ordinary meaning and any other meanings described in this disclosure, includes a process of discarding some or all changes made to a copy of one or more web pages to bring the contents of the copy back to a former or original state or condition. For example, a working copy of a web page can be restored to a state that is the same as the original web page (e.g., the production web source document) from which it was created. Any edits applied to the working copy prior to restoring it may be lost.

As used herein, the term "promote," in addition to its plain and ordinary meaning and any other meanings described in this disclosure, includes a process of moving one or more working copies of a production web source document into production. For example, when a working copy is promoted, the corresponding production web source document is replaced with the content of the working copy.

As used herein, the term "publish," in addition to its plain and ordinary meaning and any other meanings described in this disclosure, includes a process of making one or more production web source documents available to the public or a designated community of users. For example, while a production web source document may be privately accessible by only a few designated users (e.g., web site editors or administrators), a published web source document may be accessible by any user or a broader group of users (e.g., web site subscribers) via the Internet.

As used herein, the term "web content management system" ("WCMS"), in addition to its plain and ordinary meaning, includes, but is not limited to, any hardware and software that provides tools for creating, editing and managing website content, including a web page source document. One specific example of a WCMS is Adobe Experience Manager.

System Architecture

FIG. 1 illustrates an example client-server computing system 100 configured in accordance with an embodiment of the present invention. In this example, one or more user computing systems 110 each include a web browser 112 configured to interact electronically with a WCMS 114 hosted by a web server 116 via a communication network 118. Although depicted in FIG. 1 as separate devices, it will be appreciated than in some embodiments the user computing system 110 and the web server 116 may be integrated; for example, the WCMS 114 may be implemented locally on the user computing system 110. One or more content repositories 120 or databases operatively connected to the web server 116 and the WCMS 114 can be configured to store one or more web pages or other suitable structured documents (e.g., web page content), presentation semantics (e.g., style sheets) and/or other data created and maintained by the WCMS 114. The repositories 120 can be implemented, for example, with any suitable type of memory, such as a disk drive included in, or otherwise in communication with, the web server. Other suitable memories include flash memory, random access memory (RAM), a memory stick or thumb drive, USB drive, cloud storage service, etc. In a more general sense, any memory facility can be used to implement the repository.

As will be appreciated in light of this disclosure, the various modules and components of the system shown in FIG. 1, such as the web browser 112 and WCMS 114, can be implemented in software, such as a set of instructions (e.g., C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided herein to be carried out. It will be appreciated that, in some embodiments, various functions performed by the user computing system 110, the web server 116, and content repository 120, as described herein, can be performed by similar processors and/or databases in different configurations and arrangements, and that the depicted embodiments are not intended to be limiting. Various components of this example embodiment, including the user computing systems 110 and/or web server 116, can be integrated into, for example, one or more desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent. The network 118 can be any communications network, such as a user's local area network and/or the Internet, or any other public and/or private communication network (e.g., local and/or wide area network of a company, etc.). The browser application 112 can be implemented using any number of known or proprietary browsers or comparable technology that facilitates retrieving, presenting, and traversing information resources, such as web pages on a website, via a network, such as the Internet.

Example Computing Device

Figure 2:
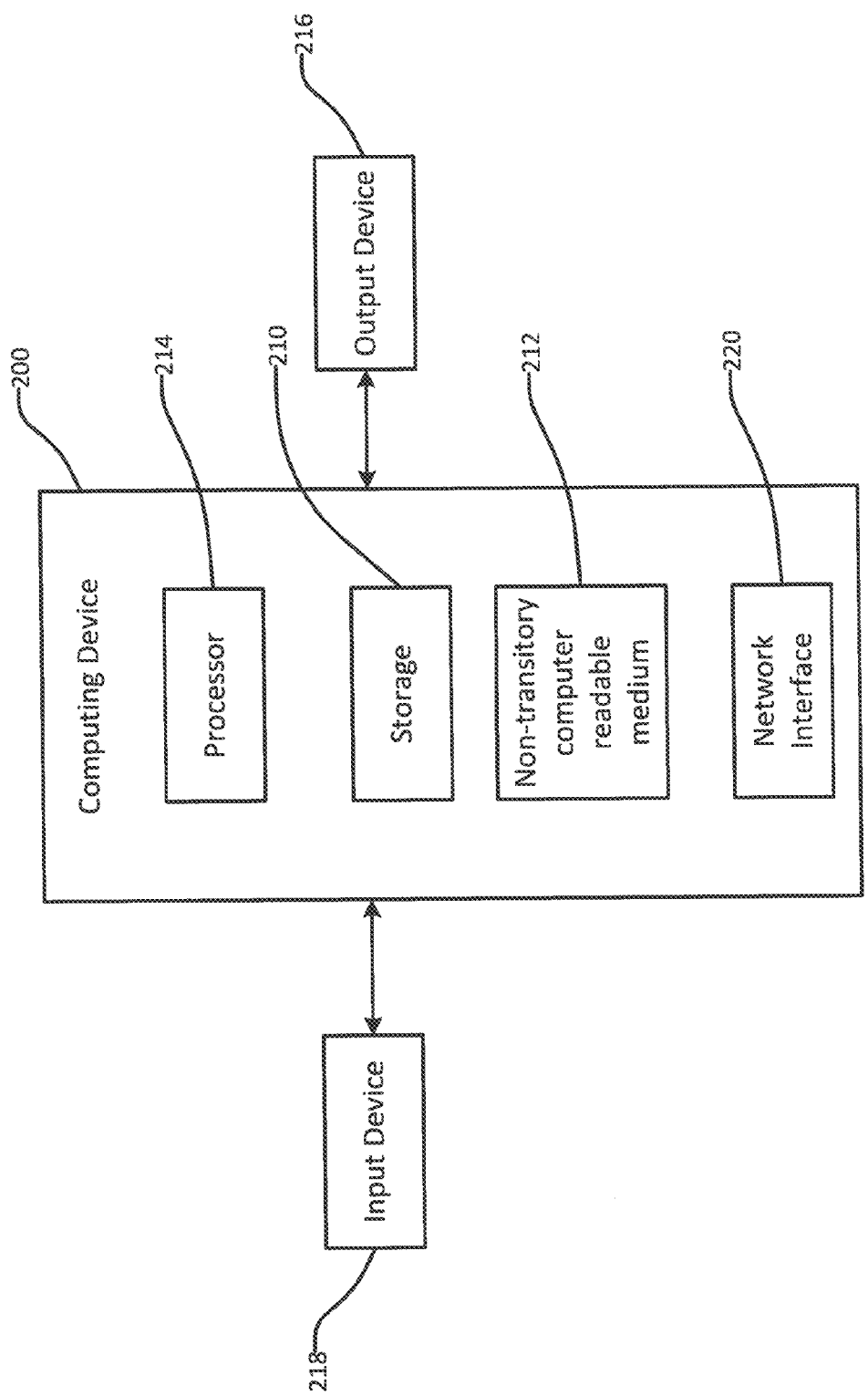
FIG. 2 is a block diagram representing an example computing device that can be used in conjunction with an embodiment of the present invention.

FIG. 2 is a block diagram representing an example computing device 200 that may be used to perform any of the techniques as variously described herein. The computing device may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described herein. A distributed computational system may be provided comprising a plurality of such computing devices.

The computing device 200 includes one or more storage devices 210 and/or non-transitory computer-readable media 212 having encoded thereon one or more computer-executable instructions or software for implementing techniques as variously described herein. The storage devices 210 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught herein. The storage devices 210 may include other types of memory as well, or combinations thereof. The storage devices 210 may be provided on the computing device or provided separately or remotely from the computing device. The non-transitory computer-readable media 212 may include, but are not limited to, one or more types of hardware memory, non-transitory tangible media (for example, one or more magnetic storage disks, one or more optical disks, one or more USB flash drives), and the like. The non-transitory computer-readable media 212 included in the computing device may store computer-readable and computer-executable instructions or software for implementing various embodiments. The computer-readable media 212 may be provided on the computing device 200 or provided separately or remotely from the computing device 200.

The computing device 200 also includes at least one processor 214 for executing computer-readable and computer-executable instructions or software stored in the storage device 210 and/or non-transitory computer-readable media 212 and other programs for controlling system hardware. Virtualization may be employed in the computing device so that infrastructure and resources in the computing device may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 200 through an output device 216, such as a screen or monitor, which may display one or more user interfaces provided in accordance with some embodiments. The output device 216 may also display other aspects, elements and/or information or data associated with some embodiments. The computing device 200 may include other I/O devices 218 for receiving input from a user, for example, a keyboard or any suitable multi-point touch interface, a pointing device (e.g., a mouse, a user's finger interfacing directly with a display device, etc.). The computing device 200 may include other suitable conventional I/O peripherals.

The computing device 200 may include a network interface 220 configured to interface with one or more networks, for example, a Local Area Network (LAN), a Wide Area Network (WAN) or the Internet, through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. The network interface 220 may include a built-in network adapter, network interface card, PCMCIA network card, card bus network adapter, wireless network adapter, USB network adapter, modem or any other device suitable for interfacing the computing device to any type of network capable of communication and performing the operations described herein. The network interface 220 may include one or more suitable devices for receiving and transmitting communications over the network including, but not limited to, one or more receivers, one or more transmitters, one or more transceivers, one or more antennas, and the like.

The computing device 200 may run any operating system, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described herein. In a more general sense, any suitable combination of hardware, software, and firmware can be used, as will be apparent.

Overview of Concurrent Preparation of Multiple Versions of a Website

Figure 3:
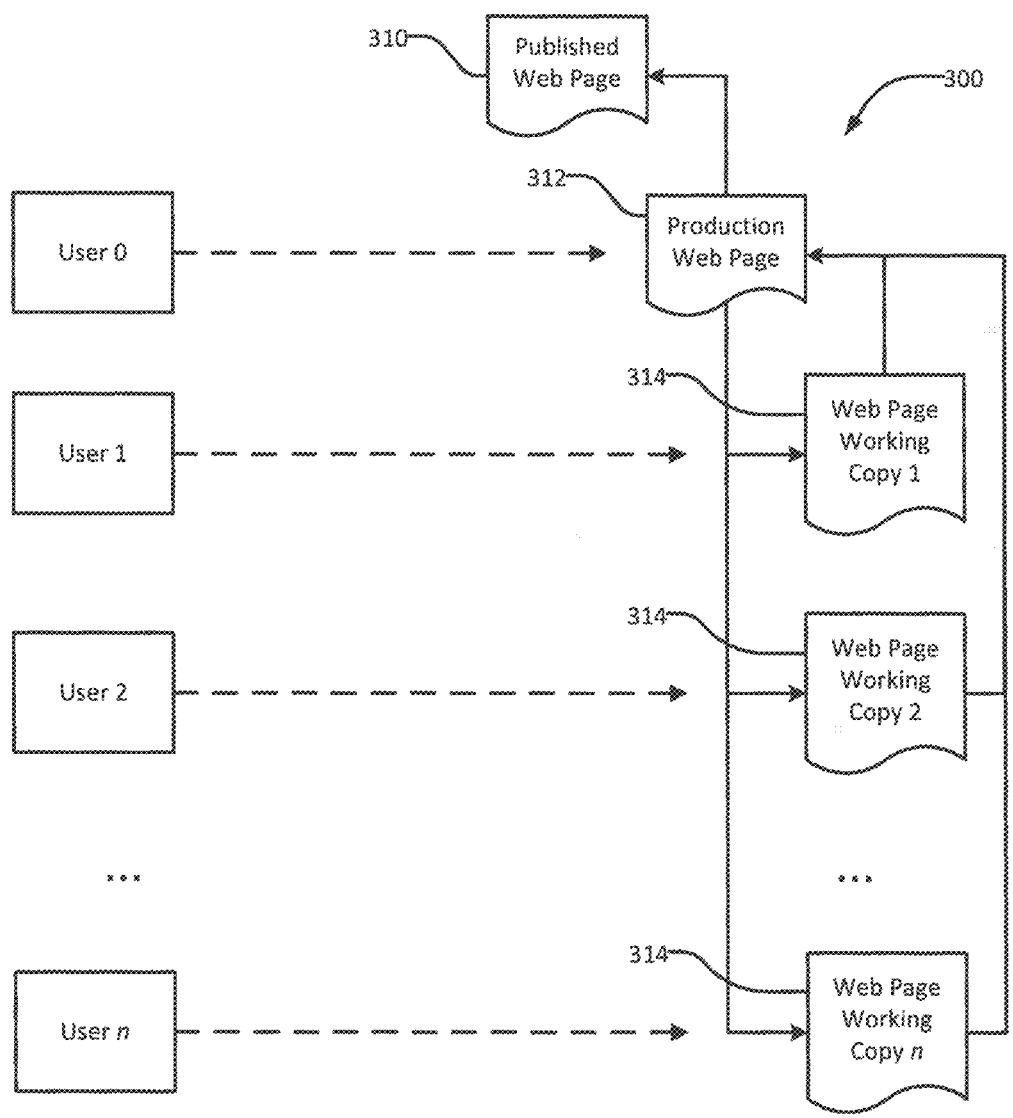
FIG. 3 illustrates an overview of an example web page document structure for concurrent preparation of multiple versions of a website that can be used in conjunction with an embodiment of the present invention.

FIG. 3 illustrates an overview of an example web page document structure 300 for concurrent preparation of multiple versions of a website that may be used in conjunction with various embodiments. In one embodiment, a published web page 310 is a so-called live version of a production web page 312. The published web page 310 may, for example, include an instance of the web page that is available via the World Wide Web to the general public or other designated users. The published instance 310 is not generally modified directly. Instead, if any revisions to the live version are desired, appropriate changes are first applied to the production version 312 on the authoring instance, and then the production version 312 is copied to the live version 310 after the changes are validated and approved, usually by a primary user designated in FIG. 3 for explanatory purposes only as User 0.

Concurrently, one or more working copies of the web page 314 can be branched, or created, from the production version 312 at any time. Generally, each working copy 314 is initially created as a partial or complete copy of the production version 312 as it exists at the time the working copy 314 is created, although it will be understood that in some embodiments a particular working version 314 may contain only some portions of the production version 312, or none at all, depending on factors such as user preferences, user access and/or modify privileges, and/or other suitable considerations. Each working copy 314 can be requested and edited by one or more different users, designated in FIG. 3 for explanatory purposes only as User 1, User 2, . . . and User n. In this example, User 1 can edit working copy 1, User 2 can edit working copy 2, and User n can edit working copy n. However, it will be understood that any one user, e.g., User 0, User 1, User 2, etc., may request and/or edit any number of working copies; for instance, User 1 may edit working copies 1 and 2, User 2 may edit working copies 1 and 2, etc. Each working copy 314 can be edited independently of any other working copies 314 and independently of the production 312 and published 310 versions of the web page. However, in some embodiments, any or some changes applied to the production version 312 can be automatically propagated to one or more of the working copies 314. At any time, any of the working copies 314 can be promoted to production 312 by replacing the production version of the web page 312 with the respective working copy 314. Subsequent to promoting the working copy 314, the working copy 314 may continue to exist and can be edited by an appropriate user, as described above, independently of the production 312 and published 310 versions. Once one of the working copies 314 is promoted to production 312, the revised production version 312 can be published by replacing the published version 310 with the revised production version 312. Various sequences for the concurrent preparation of multiple versions of the web page will be apparent in light of the present disclosure. One example sequence is illustrated and described below with respect to FIG. 5.

Example Functions

Figure 4:
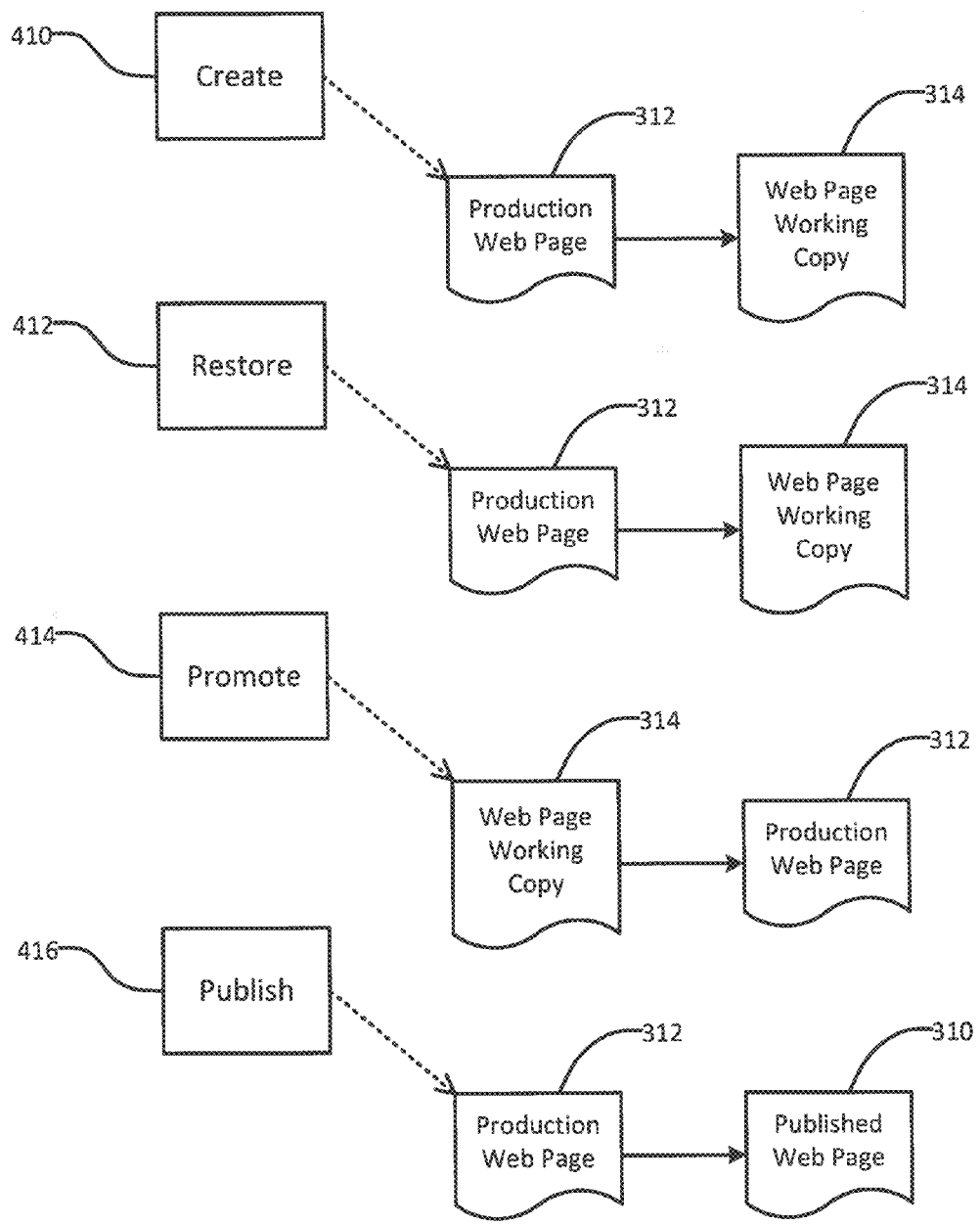
FIG. 4 illustrates several example representative functions that can be used in conjunction with an embodiment of the present invention.

FIG. 4 illustrates several example representative functions that can be used in conjunction with embodiments described herein for concurrent preparation of multiple versions of a website. First, a create function 410 includes a process whereby a production version of a web page 312 or multiple web pages is branched, or copied, to create a working copy 314 or copies thereof. The create function 410 may, for example, be employed when the user wishes to begin making changes to the web page without immediately applying those changes directly to the production web page 312. Any number of separate working copies of the production web page 314 can be created. The create function 410 does not necessarily change the production web page 312 in any manner. As mentioned above, in some embodiments, the working copy 314 can be a complete copy of the production website, while in some other embodiments, the working copy 314 includes only a copy of portions of the production website, as designated, for example, by a user. In some embodiments, an inherit function may be included as part of the create function to automatically apply any changes applied to the production version 312 to the working copy 314 subsequent to the initial creation of the working copy 314. In some embodiments, the create 410 and inherit functions can be activated by the user via, for example, a suitable graphical user interface.

Second, a restore function 412 includes a process whereby all or part of the working copy of the web page 314 is replaced by a copy of the production web page 312. For instance, any or some changes applied to the working copy 314 relative to the production version 312 may be removed, thereby restoring the working copy 314 to a state in which the content is the same as the production version 312. In some embodiments, the user can control which changes to the working copy 314 are restored. In some embodiments, a difference function may be included as part of the restore function 412 to indicate to the user, via, for example, a suitable graphical user interface, which portions of the working copy 314 are different from the production version 312 to assist the use of the restore function 412. In some embodiments, the restore function 412 can be activated by the user via, for example, a suitable graphical user interface.

Third, a promote function 414 includes a process whereby the production web page 312 is replaced by all or part of the working copy of the web page 314. The promote function 414 may, for example, be employed when the user wishes to incorporate any changes applied to the working copy 314 into the production version 312. Once the working copy of the web page 314 has been promoted, the working copy 314 may continue to exist for further editing independently of the production version 312, or the working copy 314 may be deleted. In some embodiments, the promote function 414 can be activated by the user via, for example, a suitable graphical user interface.

Fourth, a publish function 416 includes a process whereby a published web page 310 is replaced by a copy of the production web page 312. The publish function 416 may, for example, be employed when the user wishes to make the production version 312 of the website live or otherwise available to other users (e.g., over the Internet). The published web page 310 can exist independently of the production web page 312 in that any changes subsequently applied the production version 312 are not applied to the published version 310 until the production version 312 is published. In some embodiments, the publish function 416 can be activated by the user via, for example, a suitable graphical user interface.

Example Sequence for Concurrent Preparation

Figure 5:
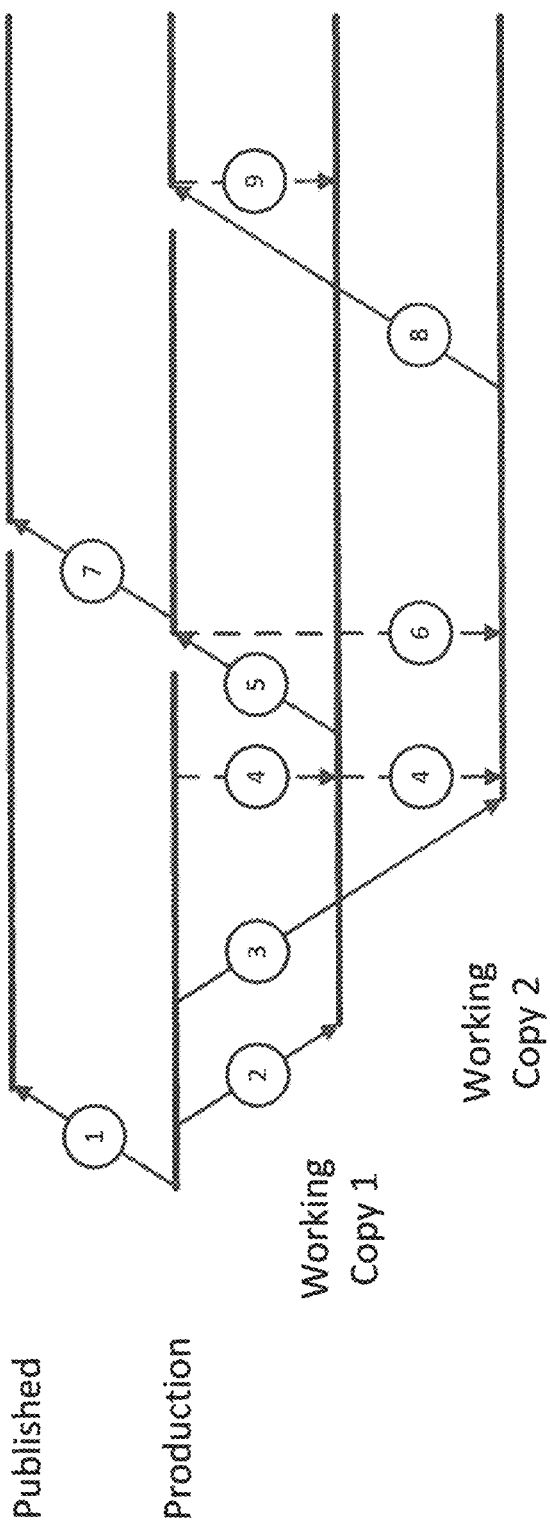
FIG. 5 illustrates an example representative sequence for concurrent preparation of multiple versions of a website in accordance with an embodiment of the present invention.

FIG. 5 illustrates an example representative sequence for concurrent preparation of multiple versions of a website in accordance with an embodiment. Such a website may include one or more web pages. In this example, four versions of the website are represented as horizontal bars: a published version, a production version, and two separate working copies of the production version. In some embodiments there can be any number of working copies, as will be apparent in light of the disclosure. It will be understood that the sequence depicted in FIG. 5 is only one example, and that the functions described with respect to this example can be performed in any order, as will be apparent.

The arrow indicated at reference 1 represents a publish function, such as described with respect to FIG. 4. That is, the production website is published, creating a published website that is initially the same as the production website. As noted above, the published website can exist independently of the production website in that any changes subsequently applied the production version are not applied to the published version until the production version is published.

The arrow indicated at reference 2 represents a create function, such as described with respect to FIG. 4. That is, the production version of the website is branched, or copied, to create the first working copy of the production website. Likewise, the arrow indicated at reference 3 represents a create function for creating the second working copy of the production website. The first and second working copies can exist independently of each other in that any changes subsequently applied to one working copy are not applied to the other working copy.

The arrow indicated at reference 4 represents an edit function applied to the production website, which is automatically applied to each of the working copies. In other words, an edit applied to the production version can, in some cases, be automatically propagated to each working copy so that the working copies inherit any changes to the production version. This can be desirable, for example, if a user wishes to incorporate any changes made to the production version while continuing to apply edits to the working copy independently of the production version. In some embodiments, the user can designate which, if any, edits are automatically applied to the respective working version.

The arrow indicated at reference 5 represents a promote function applied to the first working copy, such as described with respect to FIG. 4. That is, the production website is replaced by the first working copy of the website, and the previous version of the production website is discarded. The arrow indicated at reference 6 represents the promote function at reference 5 being applied to the second working copy in a similar manner to an edit that is applied directly to the production website, such as described with respect to reference 4. However, in this case, the newly promoted production version is automatically merged with the second working copy so that the second working copy inherits all of the changes made to the production website by the promotion of the first working copy. The arrow indicated at reference 7 represents another publish function applied to the production website, which replaces the previous version of the published website with the newly promoted production website.

The arrow indicated at reference 8 represents a promote function applied to the second working copy in a similar manner to the promote function applied to the first working copy at reference 5. However, in this case, the production website is replaced by the second working copy instead of the first working copy, and the previous version of the production website is discarded. The arrow indicated at reference 9 represents the promote function at reference 8 being applied to the first working copy, such that the first working copy automatically inherits the changes made to the production website when the second working copy is promoted. The example sequence described above can continue indefinitely and in no particular order, as will be apparent.

Example Methodology

Figure 6:
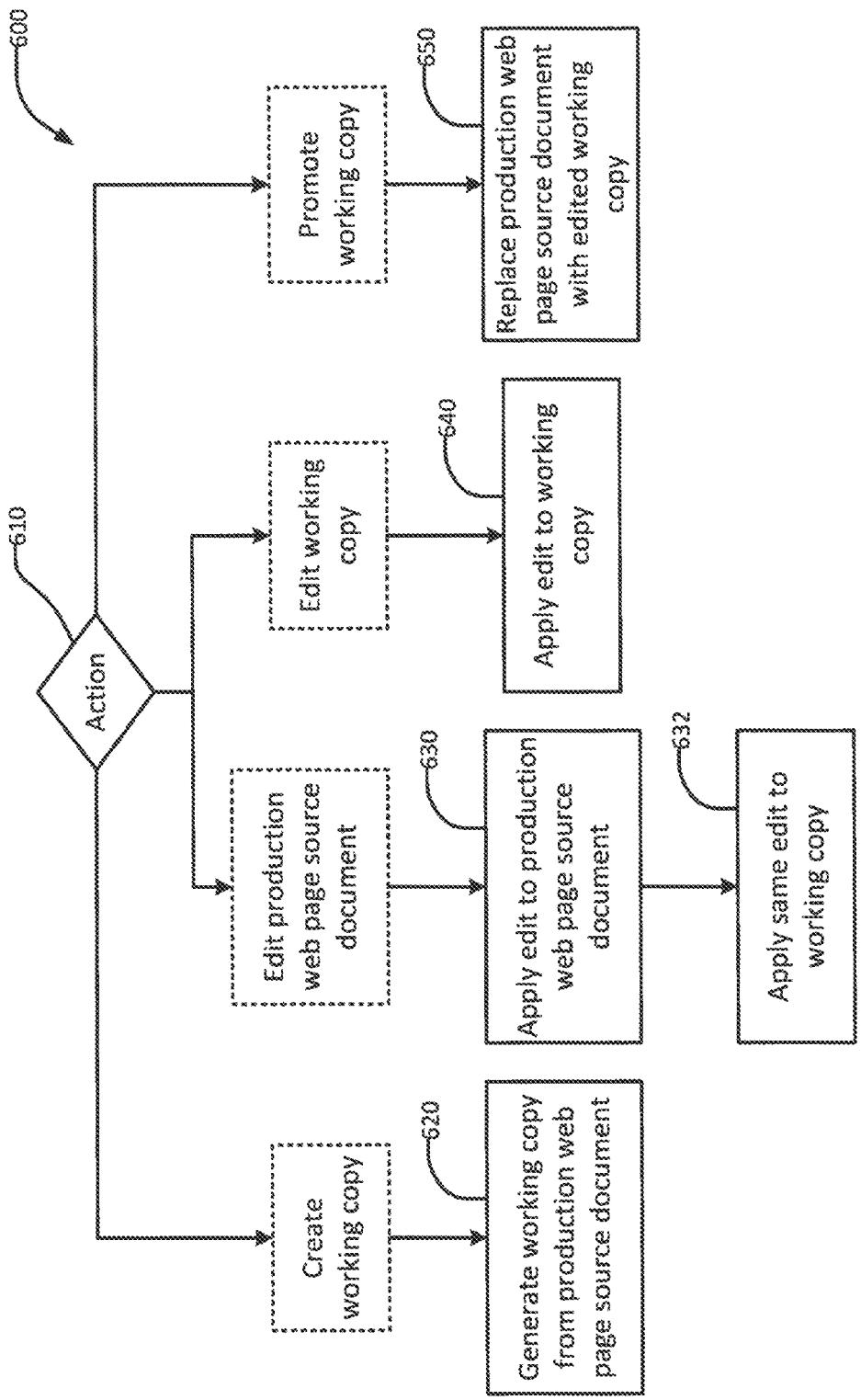
FIG. 6 illustrates an example methodology for concurrent preparation of multiple versions of a website in accordance with an embodiment of the present invention.

FIG. 6 illustrates an example methodology 600 for concurrent preparation of multiple versions of a website in accordance with an embodiment. In this example methodology, one or more users can perform one or more actions 610 on a web page source document. As described above with respect to FIG. 3, there can be several different types of web page source documents, including a published web page, a production web page, and any number of working copies of the production web page.

One action in the example methodology includes generating a working copy 620 of one or more production web pages source document in response to a request from a user to create the working copy, also referred to as creating a branch of the production web page(s). Another action includes applying an edit to the production web page source document 630 in response to a request from the same or a different user to edit the production web page source document. In response to applying the edit to the production web page source document, the same edit that was applied to the production web page source document is automatically applied to the working copy 632. If there are multiple working copies, the same edit can be applied to each working copy. In some embodiments, the same edit is not necessarily applied automatically to the working copy in response to applying the edit to the production web page source document. For example, the user may designate which edits are automatically applied to the working copy and which edits are not automatically applied.

Another action in the example methodology includes applying an edit to the working copy 640 independently of the production web page source document in response to a request from the first user to edit the working copy. The edit can be different than the edit applied to the production web page source document, and this edit is not necessarily applied to the production version. In this manner, the working copy may differ from the production web page source document in that the second edit exists in the working copy but not in the production version. Another action includes replacing the production web page source document with the edited working copy 650 in response to a request from the first user to promote the working copy to production. In some embodiments, the working copy can continue to exist separately from the production web page after it has been promoted, and subsequent edits applied to the working copy are not necessarily applied to the production web page until the working copy is promoted again.

Figure 7:
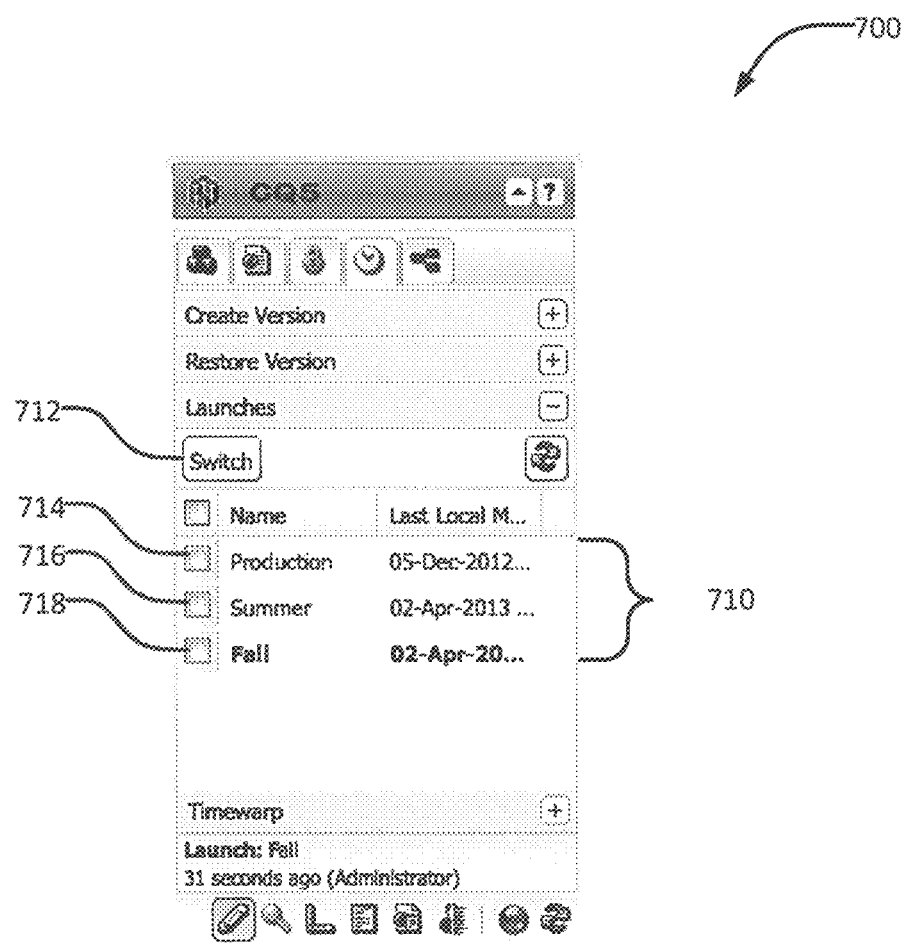
FIG. 7 illustrates an example graphical user interface for selecting a web page source document in accordance with an embodiment of the present invention.
Figure 8:
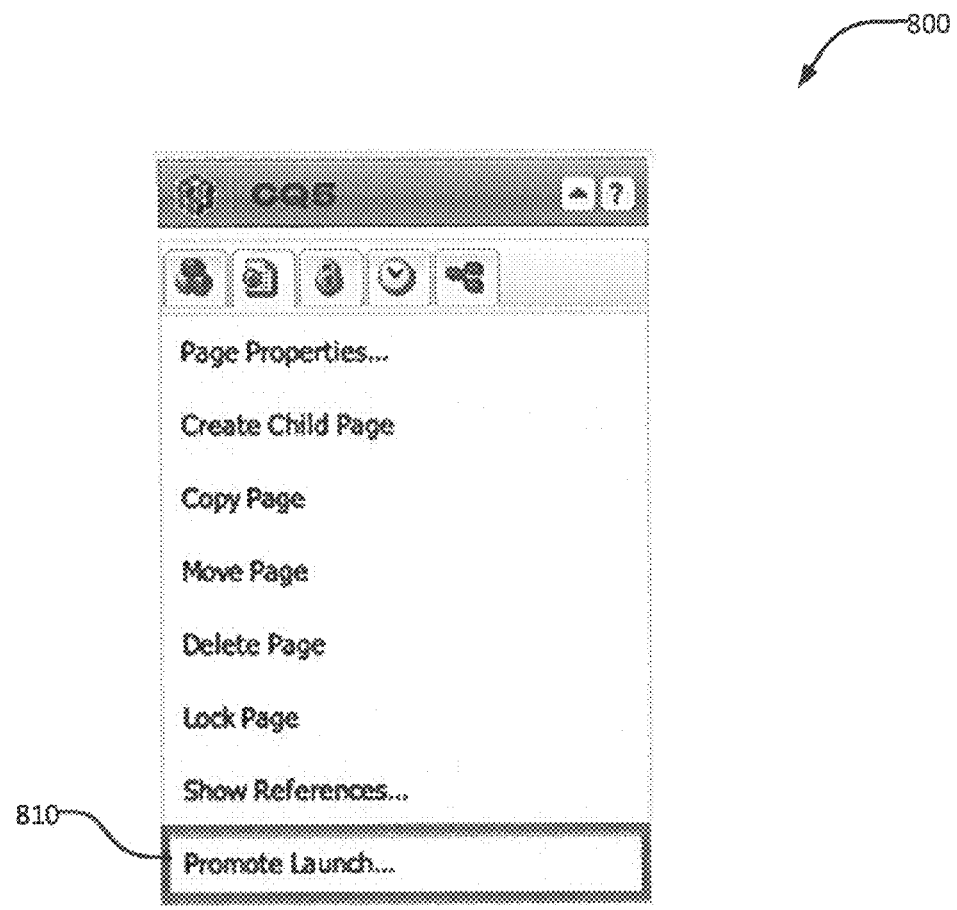
FIG. 8 illustrates another example graphical user interface for promoting a web page source document in accordance with an embodiment.

FIG. 7 illustrates an example graphical user interface 700 for selecting a web page source document in accordance with an embodiment. FIG. 8 illustrates another example graphical user interface 800 for promoting a web page source document in accordance with an embodiment. Referring first to FIG. 7, the graphical user interface 700 includes a list of web page source documents 710, identified by a user-designated name (e.g., Production, Summer, Fall), with corresponding selectors (e.g., check boxes), and an input button 712 (e.g., a Switch button). Each web page source document in the list 710 represents a separate version of a web page or a set of web pages (e.g., a production web page source document or a working copy of the production web page source document). By selecting one of the corresponding selectors 714, 716, 718 and pressing the input button 712 (e.g., the Switch button), the user can switch to the corresponding copy of the web page. From there, a button 810, such as depicted in FIG. 8, allows the user to promote a working copy to be promoted as the new production version, such as described above with respect to references 5 and 8 in FIG. 5.

Figure 9:
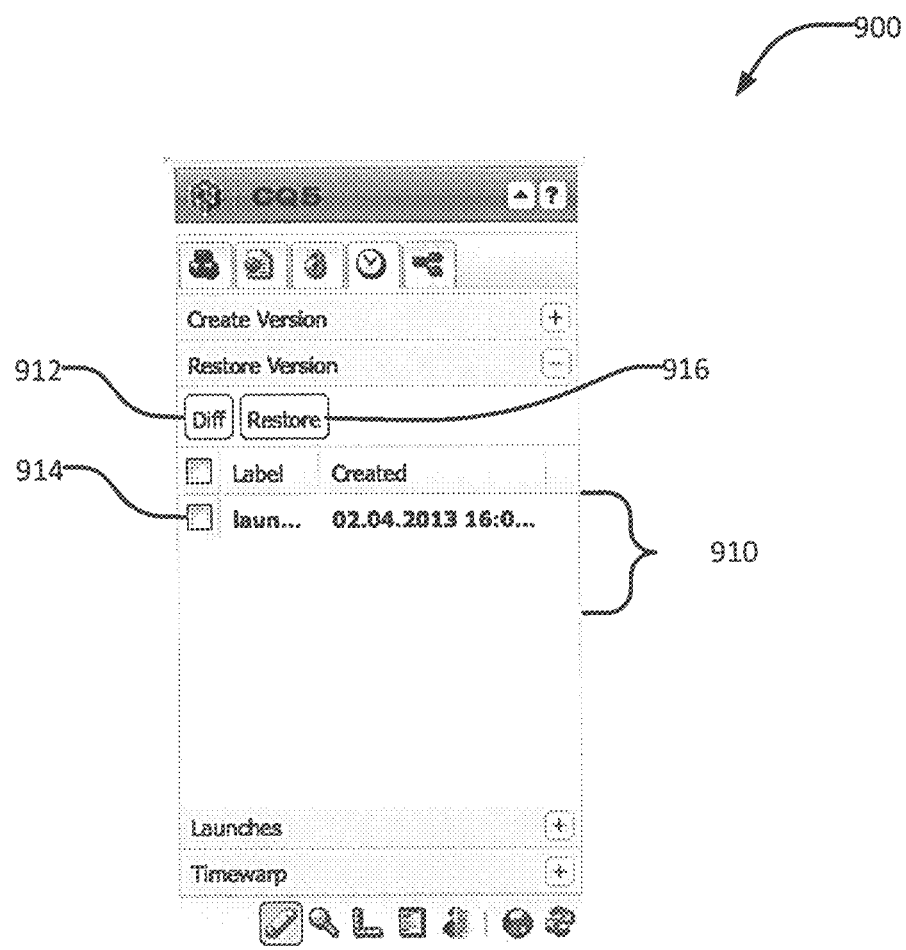
FIG. 9 illustrates another example graphical user interface for selecting a web page source document in accordance with an embodiment of the present invention.

FIG. 9 illustrates another example graphical user interface 900 for selecting a web page source document in accordance with an embodiment of the present invention. The graphical user interface 900 includes a list of web page source documents 910 in the current context of a website, identified by a user-designated name (e.g., Launch), with corresponding selectors (e.g., check boxes), and at least one input button 912 (e.g., a Differences button and a Restore button). Each web page source document in the list represents a separate version of the production web page. By selecting one of the corresponding selectors 914 and pressing one of the input buttons 912 (e.g., the Differences button), the user can initiate a process for comparing the current production web page source document to an older version of the same web page document. The results of the comparison may include, for example, portions of the respective web page source documents that are similar to and/or different from each another. By selecting one of the selectors 914 and pressing another one of the input buttons 916 (e.g., the Restore button), the user can replace the selected web page source document with another version of the web page source document (e.g., replace the production web page source document with the content of a previous version). When a working copy web page is promoted to become the new production web page, such a backup version will be generated before the content of the production web page is replaced by the one of the working copy web page.

Numerous embodiments will be apparent in light of the present disclosure, and features described herein can be combined in any number of configurations. One example embodiment of the invention provides a computer-implemented method. The method includes, in response to a request from a first user to create a working copy of a production web page source document, generating the working copy from the production web page source document. The method further includes, in response to applying a first edit to the production web page source document, automatically applying, by a first processor, the same first edit to the working copy as that applied to the production web page source document. The method further includes, in response to a request from the first user to edit the working copy, applying, by a second processor, a second edit to the working copy independently of the production web page source document. The first and second processors may be the same processor or different processors. In some cases, the method includes, in response to a request from the first user to promote the working copy to production, replacing the production web page source document with the edited working copy. In some cases, the method includes, in response to a request from a second user to create a second working copy of the production web page source document, generating the second working copy from the production web page source document. In some such cases, the method includes, in response to applying the first edit to the production web page source document, automatically applying, by a third processor, the same first edit to the second working copy as that applied to the production web page source document, where the third processor may be the same as the first and/or second processors, or different than the first and second processors. In some such cases, the method includes, in response to a request from the second user to edit the second working copy, applying, by a fourth processor, a third edit to the second working copy independently of the production web page source document and the first working copy, where the fourth processor may be the same as the first, second and/or third processor, or different than the first, second and/or third processors. In some such cases, the method includes, in response to a request to publish the production web page source document, replacing a published web page source document with the production web page source document. In some cases, some or all of the functions variously described in this paragraph can be performed in any order and at any time by one or more different processors.

Another example embodiment provides a system including a storage having at least one memory, and one or more processors each operatively coupled to the storage. The one or more processors are configured to carry out a process including, in response to a request from a first user to create a working copy of a production web page source document, generating the working copy from the production web page source document. The process further includes, in response to applying a first edit to the production web page source document, automatically applying, by a first of the one or more processors, the same first edit to the working copy as that applied to the production web page source document. The process further includes, in response to a request from the first user to edit the working copy, applying, by a second of the one or more processors, a second edit to the working copy independently of the production web page source document. The first and second processors may be the same processor or different processors. In some cases, the process includes, in response to a request from the first user to promote the working copy to production, replacing the production web page source document with the edited working copy. In some cases, the process includes, in response to a request from a second user to create a second working copy of the production web page source document, generating the second working copy from the production web page source document. In some such cases, the process includes, in response to applying the first edit to the production web page source document, automatically applying, by a third of the one or more processors, the same first edit to the second working copy as that applied to the production web page source document, where the third processor may be the same as the first and/or second processors, or different than the first and second processors. In some such cases, the process includes, in response to a request from the second user to edit the second working copy, applying, by a fourth of the one or more processors, a third edit to the second working copy independently of the production web page source document and the first working copy, where the fourth processor may be the same as the first, second and/or third processor, or different than the first, second and/or third processors. In some cases, the process includes, in response to a request to publish the production web page source document, replacing a published web page source document with the production web page source document. In some cases, the system further includes a display device operatively coupled to at least one of the one or more processors, and the process includes displaying, via the display device, a user interface configured enable a user to promote the working copy to production. In some cases, the process includes displaying, via the display device, a user interface configured to enable a user to compare the working copy to the production web page source document. Another embodiment provides a non-transient computer-readable medium or computer program product having instructions encoded thereon that when executed by one or more processors cause the processor to perform one or more of the functions defined in the present disclosure, such as the methodologies variously described in this paragraph. As previously discussed, in some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Numerous variations will be apparent in light of this disclosure. Alterations, modifications, and variations will readily occur to those skilled in the art and are intended to be within the scope of the invention as set forth in the claims.

What is claimed is:

1. A computer-implemented method comprising:
   receiving a request from a first user to create a working copy of a production web page source document;
   in response to receiving the request from a first user to create a working copy of a production web page source document, generating the working copy of the production web page source document;
   applying a first edit to the production web page source document subsequent to generating the working copy of the production web page source document;
   in response to applying the first edit to the production web page source document, automatically applying, by a first processor, the same first edit to the working copy as that applied to the production web page source document;
   receiving a request from the first user to edit the working copy;
   in response to receiving the request from the first user to edit the working copy, applying, by a second processor, a second edit to the working copy independently of the production web page source document;
   receiving a request from the first user to promote the working copy to production; and
   in response to the request from the first user to promote the working copy to production and subsequent to automatically applying the first edit to the working copy, replacing the production web page source document with the working copy including the first and second edits,
   wherein the first and second processors may be the same processor or different processors.

2. The method of claim 1, further comprising, in response to a request from the first user to promote the working copy to production, replacing the production web page source document with the edited working copy.

3. The method of claim 1, further comprising, in response to a request from a second user to create a second working copy of the production web page source document, generating the second working copy from the production web page source document.

4. The method of claim 3, further comprising, in response to applying the first edit to the production web page source document, automatically applying, by a third processor, the same first edit to the second working copy as that applied to the production web page source document, wherein the third processor may be the same as the first and/or second processors, or different than the first and second processors.

5. The method of claim 4, further comprising, in response to a request from the second user to edit the second working copy, applying, by a fourth processor, a third edit to the second working copy independently of the production web page source document and the first working copy, wherein the fourth processor may be the same as the first, second and/or third processor, or different than the first, second and/or third processors.

6. The method of claim 1, further comprising, in response to a request to publish the production web page source document, replacing a published web page source document with the production web page source document.

7. A system, comprising:
   a storage comprising at least one memory; and
   one or more processors each operatively coupled to the storage and configured to carry out a process comprising:
   receiving a request from a first user to create a working copy of a production web page source document;
   in response to receiving the request from a first user to create a working copy of a production web page source document, generating the working copy of the production web page source document;
   applying a first edit to the production web page source document subsequent to generating the working copy of the production web page source document;
   in response to applying the first edit to the production web page source document, automatically applying, by a first of the one or more processors, the same first edit to the working copy as that applied to the production web page source document;
   receiving a request from the first user to edit the working copy;
   in response to receiving the request from the first user to edit the working copy, applying, by a second of the one or more processors, a second edit to the working copy independently of the production web page source document;
   receiving a request from the first user to promote the working copy to production; and
   in response to the request from the first user to promote the working copy to production and subsequent to automatically applying the first edit to the working copy, replacing the production web page source document with the working copy including the first and second edits,
   wherein the first and second processors may be the same processor or different processors.

8. The system of claim 7, wherein the process further comprises, in response to a request from the first user to promote the working copy to production, replacing the production web page source document with the edited working copy.

9. The system of claim 7, wherein the process further comprises, in response to a request from a second user to create a second working copy of the production web page source document, generating the second working copy from the production web page source document.

10. The system of claim 9, wherein the process further comprises, in response to applying the first edit to the production web page source document, automatically applying, by a third of the one or more processors, the same first edit to the second working copy as that applied to the production web page source document, wherein the third processor may be the same as the first and/or second processors, or different than the first and second processors.

11. The system of claim 10, wherein the process further comprises, in response to a request from the second user to edit the second working copy, applying, by a fourth of the one or more processors, a third edit to the second working copy independently of the production web page source document and the first working copy, wherein the fourth processor may be the same as the first, second and/or third processor, or different than the first, second and/or third processors.

12. The system of claim 7, wherein the process further comprises, in response to a request to publish the production web page source document, replacing a published web page source document with the production web page source document.

13. The system of claim 7, further comprising a display device operatively coupled to at least one of the one or more processors, wherein the process further comprises displaying, via the display device, a user interface configured enable a user to promote the working copy to production.

14. The system of claim 7, further comprising a display device operatively coupled to at least one of the one or more processors, wherein the process further comprises displaying, via the display device, a user interface configured to enable a user to compare the working copy to the production web page source document.

15. A non-transitory computer program product having instructions encoded thereon that when executed by one or more processors cause a process to be carried out, the process comprising:
- receiving a request from a first user to create a working copy of a production web page source document;
- in response to receiving the request from a first user to create a working copy of a production web page source document, generating the working copy of the production web page source document;
- applying a first edit to the production web page source document subsequent to generating the working copy of the production web page source document;
- in response to applying the first edit to the production web page source document, automatically applying, by a first processor, the same first edit to the working copy as that applied to the production web page source document;
- receiving a request from the first user to edit the working copy;
- in response to receiving the request from the first user to edit the working copy, applying, by a second processor, a second edit to the working copy independently of the production web page source document;
- receiving a request from the first user to promote the working copy to production; and
- in response to the request from the first user to promote the working copy to production and subsequent to automatically applying the first edit to the working copy, replacing the production web page source document with the working copy including the first and second edits,
- wherein the first and second processors may be the same processor or different processors.

16. The non-transitory computer program product of claim 15, wherein the process further comprises, in response to a request from the first user to promote the working copy to production, replacing the production web page source document with the edited working copy.

17. The non-transitory computer program product of claim 15, wherein the process further comprises, in response to a request from a second user to create a second working copy of the production web page source document, generating the second working copy from the production web page source document.

18. The non-transitory computer program product of claim 17, wherein the process further comprises, in response to applying the first edit to the production web page source document, automatically applying, by a third processor, the same first edit to the second working copy as that applied to the production web page source document, wherein the third processor may be the same as the first and/or second processor, or different than the first and second processor.

19. The non-transitory computer program product of claim 18, wherein the process further comprises, in response to a request from the second user to edit the second working copy, applying, by a fourth processor, a third edit to the second working copy independently of the production web page source document and the first working copy, wherein the fourth processor may be the same as the first, second and/or third processor, or different than the first, second and third processor.

20. The non-transitory computer program product of claim 15, wherein the process further comprises, in response to a request to publish the production web page source document, replacing a published web page source document with the production web page source document.

* * * * *